Sept. 23, 1958 — H. K. PUHARICH — 2,853,067
METHOD AND APPARATUS FOR APPLYING AN ORTHOPEDIC CAST OR THE LIKE
Filed Feb. 26, 1957 — 2 Sheets-Sheet 1

INVENTOR
HENRY K. PUHARICH
BY
Pennie, Edmonds, Morton, Barrows & Taylor
ATTORNEYS Sept. 23, 1958 H. K. PUHARICH 2,853,067
METHOD AND APPARATUS FOR APPLYING AN
ORTHOPEDIC CAST OR THE LIKE
Filed Feb. 26, 1957 2 Sheets-Sheet 2

INVENTOR
HENRY K. PUHARICH

United States Patent Office 2,853,067
Patented Sept. 23, 1958

2,853,067

METHOD AND APPARATUS FOR APPLYING AN ORTHOPEDIC CAST OR THE LIKE

Henry K. Puharich, Glen Cove, Maine, assignor to Feather Cast Corporation, Glen Cove, Maine, a corporation of Maine Application February 26, 1957, Serial No. 642,417

17 Claims. (Cl. 128—90)

The present invention relates to the application of orthopedic casts and braces, and more particularly to the application of casts or braces formed of lightweight laminated plastic materials.

In connection with the preparation and application of orthopedic and surgical casts and braces, for use in the treatment of bone fractures or other conditions requiring immobilization of parts of the body, it is often desirable to form the cast of materials such as laminated glass fiber and plastic. Such materials have substantial advantages over materials such as plaster of Paris, for example, in that, with the plastic laminate, the cast is lightweight, in relation to its strength, impervious to water, alkaline solutions, and other agents to which the cast may be exposed while in use, and the plastic laminate is substantially transparent to X-rays, so that the immobilized part may be subjected to X-ray observation with the cast in place. Heretofore, however, the use of various otherwise desirous plastic laminate materials for surgical and orthopedic casts and braces has been restricted, largely because of the difficulty of applying the material to the body part to be immobilized. As a general rule, plastic laminate casts are formed with plastic-impregnated fiber glass fabric which is applied to the body member while the plastic is in a liquid or semi-liquid form. The plastic substance is of a nature such that it will harden or set upon exposure, or the material may include suitable additives which effect the hardening by chemical reaction. When the plastic material is in its fluid or semi-fluid state, it is often sticky and hard to handle, and as a general rule, the cast must be applied rapidly and efficiently to avoid premature setting of the plastic.

In accordance with the present invention, an improved method and apparatus is provided for applying plastic laminate orthopedic and surgical casts whereby such casts may be quickly and efficiently applied while avoiding manual contact with the liquid or semi-liquid plastic substance. In the new method, a base material of fiber glass fabric is applied simultaneously with a substantially uniform layer of the plastic material, which is impregnated throughout the fabric, in a manner such that the plastic material is carried on to the body member by the base fabric or material, with the base material and plastic being applied simultaneously about the entire periphery of the body member.

In one of the advantageous forms of plastic laminate casts, the base material or fabric is formed of a length of stretchable fiber glass fabric, of knitted tubular construction, which is impregnated with a thermosetting resin. The resin is mixed with suitable accelerator and catalyst materials prior to the application, whereby internal heat is generated in the plastic material to effect the setting or hardening thereof. Of course, other types of base fabric and plastic material may be utilized in appropriate cases, and the present invention is not limited in its application to any specific materials. In the broad sense, the new method involves forming a length of the base fabric into a longitudinally compressed body, attaching one end of the material to the member to be immobilized, withdrawing the longitudinally compressed body of impregnated material from the attached end thereof to apply the material to the body member, and simultaneously forming a uniform layer of liquid or semi-liquid plastic material on the base fabric. More specifically, the new method involves the immersing of a longitudinally compressed length of base fabric in a body or reservoir of the liquid plastic material and drawing the material through an opening of predetermined dimensions while applying the material to a body member, so that a uniform layer of plastic material, as determined by the dimensions of the opening, is formed on the base fabric.

The invention also provides an improved device for applying plastic laminate orthopedic and surgical casts, which comprises a container for holding a supply of fluid or semi-fluid plastic material and for holding a body of longitudinally compressed base fabric, the container having an opening therein of predetermined dimensions which provides for the withdrawal of the fabric through the opening while simultaneously forming a layer of plastic material of substantially uniform thickness about the fabric. In one of its specifically advantageous embodiments, the new device is in the form of an annular container having a tubular or sleeve-like inner wall adapted to be received axially over the body member to which the cast is to be applied. One end wall of the container has a narrow annular slot therein, which is advantageously defined in part by the sleeve-like inner wall of the container. The walls of the container define a well or reservoir for receiving a supply of plastic, in a fluid or semi-fluid state, as well as a body of longitudinally compressed stretchable tubular base fabric. One end of the tubular base fabric is projected through the narrow annular slot and is attached to the body member to be immobilized, while the remainder of the material is retained within the well of the container. The container is then withdrawn from the point of attachment, causing the base fabric to be fed through the annular slot and applied to the body member. Simultaneously with the withdrawal of the fabric from the annular slot, an annular layer of impregnating plastic material is applied to the fabric, the dimensions of the layer of plastic material being determined by the dimensions of the slot.

For a better understanding of the invention, reference should be made to the following description and accompanying drawings in which.

Figure 1:
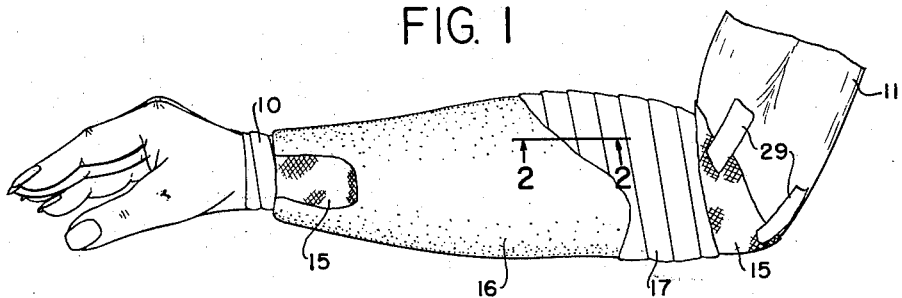
Fig. 1 is a representation of a body member or limb having a plastic laminate cast applied thereto, parts of the cast being broken away.
Figure 4:
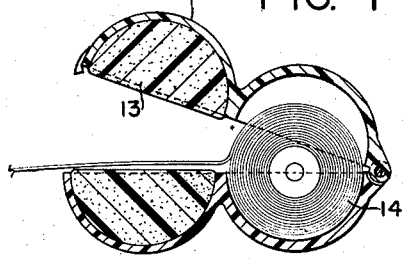
Fig. 4 is a cross-sectional view of a tape dispenser which may be used in the preparation of the cast of Fig. 1.

Referring now to the drawing, and initially to Fig. 1 thereof, an advantageous form of plastic laminate orthopedic cast is prepared by first winding a pliable tape 10 spirally about the injured portion of the body member 11. The tape 10 may be a polyvinyl alcohol tape of a type which becomes soft and pliable when moistened, so as to conform readily to the body contour and form a resin impervious layer extending two or three inches above and below the area to which the cast is to be applied. The tape may be applied from a dispenser of the type shown in Fig. 4, which comprises a casing 12 having moistening sponges 13 therein adapted to moisten both surfaces of the tape as it passes from a roll 14. The dispenser permits application of the tape without manual contact by the attendant.

Figure 2:
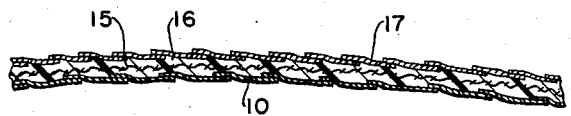
Fig. 2 is an enlarged fragmentary sectional view, taken along the line 2—2 of Fig. 1.
Figure 3:
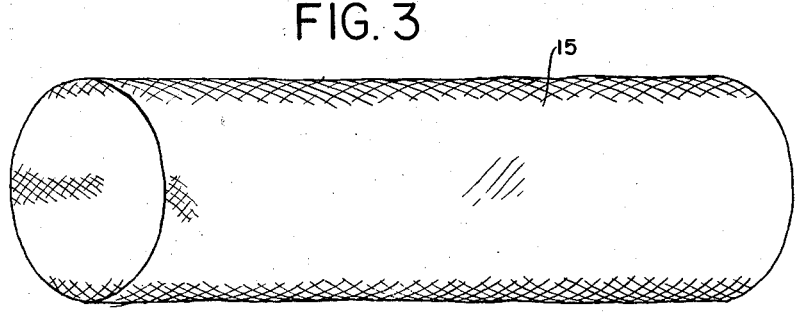
Fig. 3 is a perspective view of a length of a tubular fabric material of a type used in the cast of Fig. 1.

On top of the spirally wound tape 10 is applied the cast, which is advantageously a laminated structure of tubular knitted fiber glass fabric 15 and thermosetting plastic material 16. The plastic material 16 is in a fluid or semi-fluid state, when applied, and thoroughly impregnates the base fabric 15, as shown in Fig. 2. In this respect, the term "impregnate" is used to describe a condition in which the plastic material is thoroughly intermingled with and in surrounding relation to the threads or fibers of the fabric, and does not necessarily indicate that the plastic material is to any extent absorbed by the fibers themselves. Generally, the fabric 15 has a relatively open, knit structure, and the plastic material will flow into the spaces between treads of the fabric and is rigidly bonded to the fabric upon hardening or setting of the plastic material.

After the plastic material has hardened, an outer layer 17 of tape may be applied over the outer surface of the plastic material and, in some cases, the tape 17 may be applied while the plastic material is still somewhat soft to hasten the setting action. The latter is generally desirable where the plastic material is in the form of a thermosetting resin mixed with an accelerator to generate heat internally of the resin in order to effect setting thereof.

Although the present invention is not limited to the specific materials used in making the cast, the base fabric 15 may advantageously be of a stretchable tubular knit fiber glass fabric, while the plastic material may advantageously be of thermosetting resin mixed with an accelerator and a catalyst. By way of example, satisfactory thermosetting resins are materials such as Laminac, an unsaturated polyester resin; MR-21-Q, an unsaturated polyester; Paraplex, a polyester styrene resin; Selectron, an addition type copolymer; Plaston, a copolymer based on unsaturated polyester; and Vibrin, an unsaturated polyester with cross linking monomer. The accelerator and catalyst may be of the proper type selected in accordance with the resin used. For example, with Laminac or Selectron, a cobalt accelerator may be used with N-butyl hydroperoxide as a catalyst. A cast formed of such materials is extremely light in weight weighing approximately two ounces per square foot of laminated surface averaging one-eighth inch in thickness. The laminated material is highly porous, providing adequate ventilation of the underlying skin, and is substantially transparent to X-ray. The cast is non-shrinking, waterproof, and is unaffected by ordinary acids or alkalies.

Figure 5:
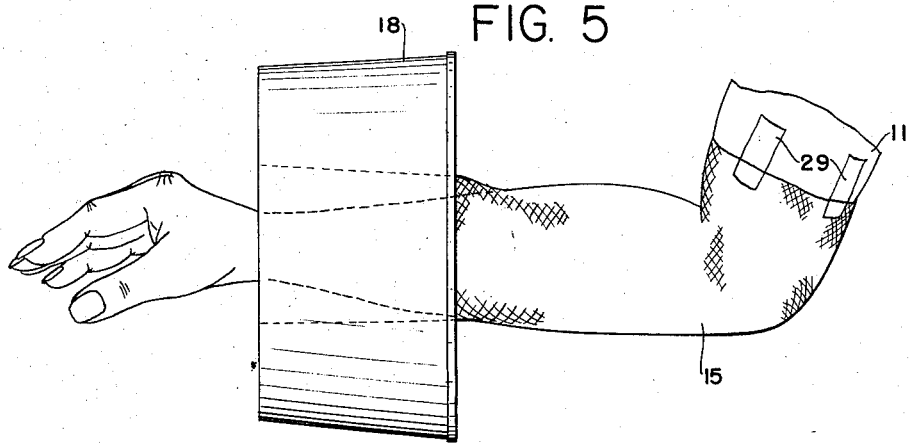
Fig. 5 is a representation of a body member or limb, illustrating the application of a cast thereto in accordance with the new method and using the apparatus of the invention.

In the past, the application of the liquid or semi-liquid plastic material to form the laminated structure has been a considerable problem, since the plastic is generally difficult to handle, using ordinary facilities. In accordance with the invention, however, the cast may be conveniently applied using the improved device shown in Figs. 5 and 6.

Figure 6:
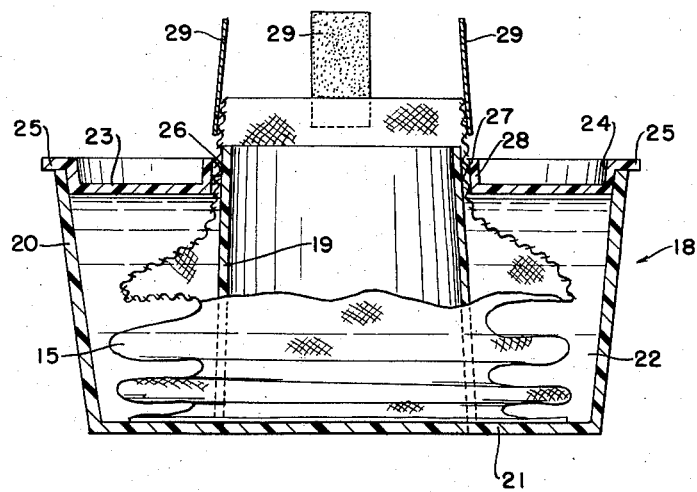
Fig. 6 is a longitudinal cross-sectional view of the cast-applying device of the invention.

Referring to Fig. 6, the improved applying device comprises, in general, an annular container 18, having a tubular, sleeve-like inner wall 19, an outer wall 20 and a bottom wall 21 forming an annular well or reservoir 22. In the illustrated form of the invention, the sleeve-like inner wall 19 is slightly longer than the outer wall 20, and projects axially beyond the general outlines of the container. An annular cap 23 is provided which has axial and radial flange portions 24, 25 about its outer edge. The axial flange portion 24 is adapted to fit snugly within the outer wall 20 of the container, forming a seal therewith, while the radial flange portion 25 seats against the end of the wall 20, forming an abutment for accurately positioning the cover 23 with respect to the body of the container.

In accordance with the invention, the cover 23 has a central opening 26 which is of greater diameter than the adjacent portion of the sleeve-like inner wall 19, whereby a narrow annular slot 27 is defined by the opening 26 and wall 19. As shown in Fig. 6, the cover 23 is provided with an axial flange 28 about the edges of the central opening 26, the flange portion 28 extending in generally parallel relation to the sleeve-like inner wall 19 to form an extension of the annular slot 27.

In using the device of Fig. 6, the cover 23 is removed to expose the reservoir or well 22, and a predetermined length of base fabric material 15, such as knitted fiber glass, is applied over the sleeve-like inner wall 19 of the container 18, in surrounding relation to the wall 19, so that the length of fabric is compressed longitudinally and gathered into a compact body in the well 22, substantially as shown in Fig. 6. Next, a quantity of plastic material is poured into the well. For a cast of average size, the plastic material may comprise a mixture of 16 ounces of thermosetting polyester resin, such as Laminac, 0.08 ounce of an accelerator, such as cobalt acinate, and 0.16 ounce of a catalyst, such as Lubersol D. D. M. The various materials are thoroughly mixed, generally before the material is poured into the well 22.

After both the fabric 15 and plastic material are received in the container well 22, the cover 23 is applied to the container in a manner such that the terminal end of the fabric projects outwardly through the narrow annular slot 27. The container is thereby closed, except for the slot 27, and, advantageously, the width of the slot is not substantially greater than the thickness of the fabric. The arrangement is such that the fabric may pass freely through the annular slot 27, while the free flow of semi-liquid plastic material through the slot is prevented or inhibited.

It is contemplated that preliminary preparation of the body member 11 will be completed when the container 18 is filled and covered, so that the cast may be applied immediately. To this end, the container 18 is applied axially over the member 11, it being understood that the diameter of the opening through the sleeve-like inner wall 19 is somewhat greater than that of the body member 11. The container 18 is applied over the limb 11 to a point beyond the area to be immobilized, whereupon the projecting terminal end of the tubular length of fabric 15 is attached to the body member, as by means of adhesive fasteners 29.

After the terminal end of the fabric has been fastened to the body member 11, the container 18 is withdrawn axially over the limb, away from the attached end of the fabric. The fabric is thereby drawn outwardly through the narrow annular slot 27 between the wall 19 and cover flange 28. The fabric in the container well 22 is, of course, immersed in the semi-liquid plastic material and is thoroughly impregnated therewith. As the material is progressively withdrawn through the annular slot 27, the plastic material adhering to the fabric is partly wiped off and a uniform layer of plastic of desired thickness is formed on the base fabric material. The composite laminated material then moves outwardly over the end of the sleeve-like wall 19 and onto the limb 11. The fabric material 15, being stretchable and self-contracting, draws itself into firm contact with the body member 11 in the manner desired.

When all the material has been withdrawn from the container 18 the container is completely withdrawn from the body member 11 and set aside. The cast is, at this time, essentially complete and may be allowed to set to immobilize the body member 11. However, since the plastic material employed may be thermosetting resin set by internal heat produced by an exothermic reaction of the accelerator, it may be advantageous to provide a layer of tape 17, such as shown in Fig. 1, over the outer surface of the plastic to hasten the setting action. After the initial setting of the plastic material, the outer layer of the tape may be removed. In some cases, hardening of the plastic material may continue for several days. However, the material is of sufficient hardness and rigidness to completely immobilize the body member 11 after about 30 or 35 minutes.

The completed cast conforms intimately with the compound surfaces of the body upon application, and hardens to conformity with these surfaces. Advantageously, the inner layer of polyvinyl alcohol tape is gradually dissolved by body fluids exuded by the underlying skin, leaving the plastic impregnated fabric cast in direct contact with the body member.

Hardening of the plastic material after application of the cast may be controlled by varying the amount of the accelerator and/or by the application of external heat, where desired. The quantity of accelerator is controlled in accordance with the thickness of the layer to be bonded and the external temperature, so as to prevent the temperature of the plastic rising to a point which is injurious to the body. As a general rule, the temperature should not exceed 120°, in which case the curing time for the cast is from 30 to 45 minutes.

Application of plastic laminate orthopedic and surgical casts in accordance with the invention greatly facilitates the use of such casts and permits the realization of their numerous advantages. The liquid or semi-liquid plastic material and the fabric base material are handled in such a manner that the application thereof to the body member to be immobilized is rapid and efficient and may be accomplished substantially without manual contact by the attendant, and in a manner such that little if any mess is created. The base fabric is immersed in a bath of the semi-liquid plastic material prior to application of the casts, so that thorough impregnation of the material is assured, and the material is withdrawn from a narrow slot which limits the amount of plastic material which can be carried along with the material, and forms the plastic material into a layer of substantially uniform thickness.

In its most advantageous form, the new applying device is in the form of an annular container, having a sleeve-like inner wall which is received axially over the body member to be immobilized and forms a guide for the plastic impregnated material as the container is withdrawn from the attached end of the material. The sleeve-like wall is of greater diameter than the body member, to facilitate movement of the applying device, but the inherent resilience of the stretchable base fabric causes the impregnated fabric to be drawn firmly into contact with the area to be supported and immobilized.

The method and apparatus of the invention not only provide for the application of plastic laminate casts with substantially greater speed and convenience, but further provide a finished cast of improved quality, particularly in regard to the uniformity of impregnation of the plastic material into the fabric and to the uniformity of thickness of plastic layer. In this respect, it will be noted that as the base fabric contracts, to conform with the compound surfaces of the body member, the thickness of the plastic layer will be increased, and in some places more than others. However, this is relatively inconsequential, and a greater uniformity of plastic thickness is provided in the finished product than with prior techniques.

It should be understood that the method and apparatus as specifically described herein is intended to be representative only, as certain departures may be made therefrom within the clear teachings of the invention. Accordingly, reference should be made to the following appended claims in determining the full scope of the invention.

I claim:
1. The method of applying an orthopedic cast or the like of the type including a length of flexible tubular material and an agent for stiffening the material, which includes compressing said length of material lengthwise and impregnating the material with the stiffening agent while maintaining the flexibility of said material, applying the impregnated and compressed length of material over a member to be braced, attaching an end of said length of material to said member, and withdrawing portions of said length of material from the attached end thereof whereby to elongate said compressed length of material and cover portions of said member.

2. The method of claim 1, in which said length of tubular material is compressed and substantially immersed in a body of stiffening agent, and said material is progressively withdrawn from said body of stiffening agent during the step of withdrawing portions of said material from the attached end thereof.

3. The method of applying an orthopedic cast or the like of the type including a length of flexible material and an agent for stiffening the material, which includes compressing said length of material lengthwise and impregnating the material with the stiffening agent while maintaining the flexibility of said material, attaching an end of the impregnated and compressed material to a member to be braced, and withdrawing portions of said length of material from the attached end thereof whereby to elongate said compressed length of material and cover a portion of said member.

4. The method of claim 3, in which the compressed length of material is substantially immersed in a body of stiffening agent and said length of material is progressively and substantially simultaneously withdrawn from said agent and applied to said member.

5. The method of claim 4, in which said stiffening agent includes a thermosetting resin, an accelerator, and a catalyst.

6. The method of claim 4, in which said material is stretchable knitted fiberglass fabric.

7. The method of applying an orthopedic cast or the like of the type including a length of stretchable tubular material and an agent for stiffening the material, which includes compressing the tubular length of material lengthwise to form a short annular body of material, attaching an end of the compressed material to a member to be braced, withdrawing portions of said compressed material progressively from the attached end thereof whereby to elongate said compressed material and apply said material lengthwise to said member, and substantially simultaneously with said withdrawing step progressively forming a substantially uniform layer of stiffening agent on said material.

8. The method of claim 7, in which the compressed material is substantially immersed in said stiffening agent prior to said withdrawing step, and excess agent is progressively removed from said material substantially simultaneously with said withdrawing step to form said uniform layer.

9. The method of claim 7, in which said stiffening agent is a thermosetting resin and heat is generated in said material following said withdrawing step.

10. The method of claim 9, in which said heat is generated internally of said resin by the addition thereto of an accelerator and catalyst.

11. The method of applying an orthopedic cast or the like of the type including a length of flexible tubular material and an agent for stiffening the material which includes compressing said length of tubular material lengthwise to form a relatively short annular body of material, placing said annular body of material in an annular container holding said stiffening agent and having a restricted annular slot, projecting an end of said material through said slot, applying said annular container and body of material lengthwise over said member, attaching the projecting end of said material to said member and withdrawing said container lengthwise of said member away from the attached end of said material.

12. A device for applying an orthopedic cast or the like which comprises an annular container having an outer wall and a tubular inner wall of greater diameter than the member to which said cast is to be applied, said container being of relatively short length as compared to the length of said cast and having an annular well between its inner and outer walls for retaining a supply of material stiffening agent, said well also being adapted to receive a longitudinally compressed length of tubular material in surrounding relation to said tubular inner wall, and an annular cover member received in the open end of said well, said cover member substantially closing off said well and defining a narrow annular slot surrounding said tubular inner wall, said slot being of sufficient width to permit the passage of tubular material outwardly therethrough while causing stiffening agent adhering to said material to be formed into a layer of substantially uniform thickness as said material passes outwardly through said slot.

13. The device of claim 12, characterized by said cap member having a flange at its inner edge extending in generally parallel relation to said tubular inner wall and defining therewith an axially elongated slot.

14. A device for applying an orthopedic cast or the like which comprises a tubular sleeve-like member adapted to be received axially over the member to which said cast is to be applied, said sleeve-like member being adapted to receive a longitudinally compressed length of tubular material arranged in surrounding relation to said sleeve-like member, and a wall supported in fixed relation to said sleeve-like member and defining therewith a narrow annular slot, said slot being of sufficient width to permit passage of tubular material therethrough.

15. A device for applying an orthopedic cast or the like which comprises a container for holding a supply of material stiffening agent and a longitudinally compressed length of flexible material, and means associated with said container defining a narrow slot adapted to permit the passage of said material outwardly therethrough, the edges of said slot being operative to partly confine said material stiffening agent and form a substantially uniform layer of said agent on said material.

16. The device of claim 15 characterized by the slot-defining means comprising a removable cover and having an edge defining said slot in combination with a wall of said container.

17. The device of claim 15 characterized by said container being of annular form and having a central opening therein adapted to be received axially over said member.

References Cited in the file of this patent

UNITED STATES PATENTS

| | | |
|---|---|---|
| 2,483,715 | Solon | Oct. 4, 1949 |
| 2,582,242 | Eberl | Jan. 15, 1952 |

OTHER REFERENCES

Glass Plastic Cast, Anderson et al., The American Journal of Surgery (1945), pp. 299–305.

Plastic Splints and Appliances in Orthopaedic Surgery, Herschell et al., The Journal of Bone and Joint Surgery (Reprint), pp. 298–308.